United States Patent
Tondato

[11] 3,761,215
[45] Sept. 25, 1973

[54] MOLD PRESS
[76] Inventor: Carlo F. Tondato, Strado San Vincenzo 40.10, Torino, Italy
[22] Filed: Nov. 18, 1970
[21] Appl. No.: 90,498

[30] Foreign Application Priority Data
Oct. 24, 1969 Italy .................. 53811 A/69

[52] U.S. Cl. .......... 425/193, 425/406, 100/268
[51] Int. Cl. .................................. B29c 3/00
[58] Field of Search .......... 18/16 R, 16 H; 100/214, 268; 425/193, 406, 410

[56] References Cited
UNITED STATES PATENTS

| | | | |
|---|---|---|---|
| 1,383,748 | 7/1921 | Olson et al. | 425/195 X |
| 2,103,951 | 12/1937 | Lewis | 425/195 |
| 2,559,478 | 7/1951 | Stone | 173/119 |
| 2,602,507 | 7/1952 | Adams | 173/119 X |
| 715,552 | 12/1902 | Collet | 173/119 |
| 1,006,873 | 10/1911 | Phillips | 173/120 |
| 2,815,551 | 12/1957 | Hessenberg et al. | 164/83 |
| 3,667,536 | 6/1972 | Colombo | 164/83 X |
| 3,209,057 | 9/1965 | Lassman | 18/16 R X |
| 64,584 | 5/1867 | Schubeus | 100/214 X |
| 1,174,646 | 3/1916 | Williams | 18/16 R X |
| 2,869,173 | 1/1959 | Van Hartesveldt et al. | 18/16 H |
| 2,979,770 | 4/1961 | Greene et al. | 18/16 R X |
| 3,602,948 | 9/1971 | Lejeune | 18/16 H X |

Primary Examiner—Robert L. Spicer, Jr.
Attorney—Clelle W. Upchurch

[57] ABSTRACT

An apparatus for molding plastics is provided with an elastic member adapted to press a mold top against a mold bottom and with a tie-rod assembly adapted to alternately move the elastic member from the mold top and to position it over the mold bottom without change in the pressure exerted by the elastic member against the mold top.

4 Claims, 2 Drawing Figures

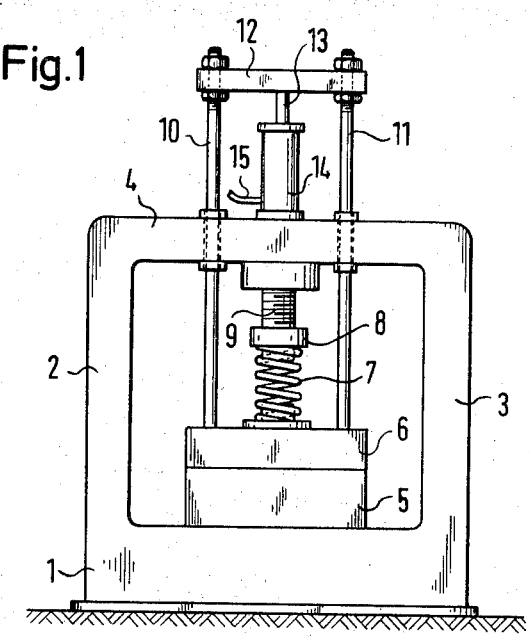
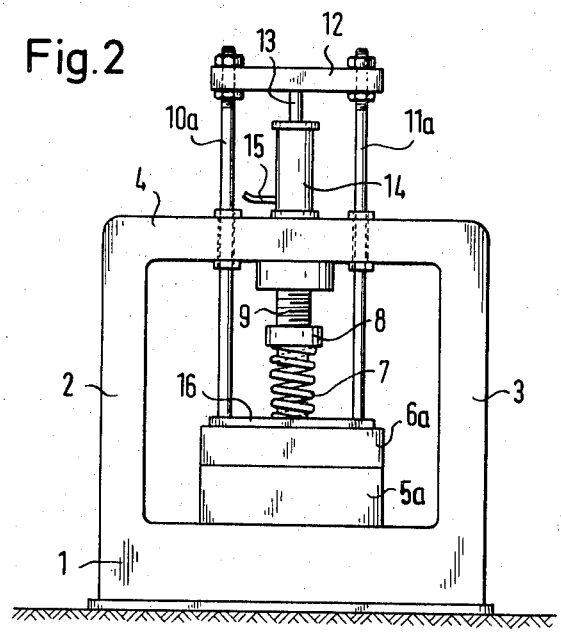

MOLD PRESS

This invention relates to a method of and an apparatus for pressing together die parts or like tools, particularly in the manufacture of articles from natural and synthetic resins or plastics, particularly from rubber or elastomers, preferably having a cellular structure.

For the moulding of articles of rubber or elastomers use is made of devices comprising a stationary lower die and a vertically movable upper die. The vertical movability of the upper die makes it possible for the material from which the articles are to be moulded and which, for example is to be shaped by the action of heat and/or pressure, to be inserted into the die cavity, and subsequently enables the moulded article to be removed from the die. Pressing devices are necessary to press the two parts of the die together.

In known pressing devices the upper and lower dies are pressed together by fastening the upper die part to the piston rod of a double acting hydraulic or pneumatic piston-cylinder assembly. The force by means of which the two parts of the die are pressed together is directly proportional to the pressure of the hydraulic or pneumatic medium. The hydraulic or pneumatic pressure medium is usually taken from a central supply system, in which fluctuations in pressure frequently occur. In consequence of these pressure fluctuations considerable pressing defects occur in the pressing-together of the die parts. In order to obviate this disadvantage it is conceivable for each pressing device to be provided with its own pressure medium supply system. The cost of purchasing such pressing device would then, however, be very high.

The invention aims at providing a simple, economical method and apparatus for pressing together die parts or like tools, which is free from the disadvantages of known pressing devices.

Accordingly, the present invention consists in a method of pressing together die parts or like tools, particularly in the manufacture of objects from natural and synthetic resins or plastics, especially rubber or elastomers, preferably having a cellular structure, characterised in that the pressing-together of the die parts is effected by a pre-stressing force, corresponding to the desired pressing force, with the aid of elastic means which act on at least one of the die parts, while through further stressing of the elastic means oppositely to the closing direction of the die parts the pressing force is relieved.

Thus, the invention ensures in a very simple and reliable manner that the die parts will be pressed together with exactly the desired force, that is a predetermined spring force. On completion of the pressing operation the pressing force is relieved again in a very simple manner.

The most diverse forms of apparatus can be used for carrying out the method of the invention. A particularly advantageous apparatus is characterised by at least one pre-stressed coil compression spring which is supported at its one end against the upper die part and at its other end against a plate fixedly mounted above said upper die part. The accurately pre-stressed coil compression spring thus applies the desired pressing pressure to the two die parts with the greatest reliability.

For the exact adjustment of the desired pre-stressing of the spring said plate is displaceable in the direction of the axis of the spring by means of a screwthreaded spindle which carries said plate. The desired pre-stressing force can thus be adjusted in a very simple manner at any time and very quickly.

In respect of the relieving of the pressing force on completion of the pressing operation there are two particularly convenient possible constructions for the pressing apparatus.

In one case the coil compression spring may be supported directly against the upper die part while the pressing force can be relieved by raising the latter. This construction is intended particularly for dies which remain at least partly in the pressing apparatus.

In the second case the coil compression spring may be supported against the upper die part with the interposition of a movable plate unconnected to the upper die part, in which case the pressing force can be relieved by raising the movable plate. This arrangement is particularly suitable for dies passing through the pressing apparatus.

In both cases a single-acting pressure cylinder together with tie rods connected by a cross-bar may be provided for raising the upper die part or the movable plate.

The increase of the stressing of the coil compression spring, which is effected on the raising of the upper die part or of the movable plate, has the additional consequence that the next pressing operation is initiated automatically and at very high speed as soon as no pressure medium is active in the pressure cylinder.

It should be added that mould parts may also advantageously replace the die parts.

In order that the invention may be more readily understood, reference is made to the accompanying drawings which illustrate diagrammatically and by way of example, two embodiments thereof, and in which:

FIG. 1 is an elevation of an apparatus according to the invention for pressing together die parts connected to the pressing apparatus, and FIG. 2 illustrates a similar device for pressing together die parts which are not connected to the pressing apparatus, that is which are removable from the apparatus.

Referring to FIG. 1 of the drawings, a lower die 5, which co-operates with an upper die 6, is fast with the base 1 of a frame 1, 2, 3 and 4. The upper and lower dies 6, 5 enclose a cavity for receiving a material which is to be maintained under pressure, that is moulded into an article.

The upper die 6 is urged against the lower die 5 by the action of a coil compression spring 7 disposed between the upper die 6 and a plate 8 fixedly mounted at one end of a screwthreaded spindle 9 which at its other end is screwed into the transverse bearer 4 of the frame. During the pressing operation the coil compression spring 7 is continuously subjected to pre-stressing, the magnitude of which can be varied by rotating the plate 8 and consequently the spindle 9 by means of its screw thread.

The upper die 6 is secured to two tie rods 10 and 11, which extend upwards through holes provided in the transverse bearer 4. The top ends of the tie rods 10 and 11 are joined together by a cross-bar 12 which is carried by the piston rod 13 of a piston disposed in a single-acting pressure cylinder 14. When pressure medium is introduced into the cylinder 14 through a pipe 15, the piston rod 13 together with the bar 12 is raised.

The upper die 6 is thereby lifted off the bottom die 5 by means of the tie rods 10 and 11, so that the die cavity is freely accessible. At the same time the stressing of the coil compression spring 7 is increased, which has the consequence that the next closing of the pressing apparatus is initiated automatically and at high speed as soon as no pressure medium is acting in the cylinder 14.

The apparatus illustrated in FIG. 2 serves for pressing together die parts 5a and 6a which are not connected to the pressing device. As can be seen from the drawing, in this apparatus the tie rods 10a and 11a are not fastened to the top die part 6a but to a plate 16 which is not connected to the upper die part 6a. In other respects the construction and mode of operation of this apparatus corresponds to the embodiment illustrated in FIG. 1.

The devices described above can be varied in different ways. For example, the coil spring 7 can be replaced by a pneumatic dash pot assembly and the pressure cylinder 14 by a motor of another kind, for example a linear electromagnetic motor or by a lifting mechanism which can be operated by a conventional electric motor or optionally also by hand. The two die parts 5, 6 and 5a, 6a can similarly be replaced by mould parts.

I claim:

1. An apparatus for molding plastics comprising a die having a cavitated base and a lid separable therefrom, means for pressing the lid against the base comprising a spring compressed between the lid and a rigid back-up plate spaced above the lid, and means for lifting the lid from the base and for compressing the spring comprising a pair of tie rods secured at one end to the lid and at the other end to a cross-bar above the spring, a hydraulic cylinder having a piston therein and a piston rod secured to the cross-bar, means for charging fluid under pressure into the cylinder to actuate the piston and to lift the cross-bar, and means for releasing the fluid from the cylinder, whereby upon the said release of fluid the compressed spring presses the lid against the base.

2. An apparatus for molding plastics comprising a die having a cavitated base and a lid separable therefrom, means for pressing the lid against the base comprising a separable plate disposed on the lid and a spring compressed between the plate and a rigid back-up plate spaced above the separable plate and means for lifting the plate from the lid and for releasing the spring's pressure from the lid comprising a pair of tie rods secured at one end to the separable plate and at the other end to a cross-bar disposed above the spring, a hydraulic cylinder having a piston therein and a piston rod secured to the cross-bar, means for charging fluid under pressure into the cylinder to actuate the piston and to lift the cross-bar, and means for releasing the fluid from the cylinder, whereby upon the said release of fluid the compressed spring presses the separable plate against the lid and presses the lid against the base.

3. An apparatus for molding plastics comprising a die having a cavitated base and a lid separable therefrom, means for pressing the lid against the base comprising a spring, and means for compressing the spring and thereby release the lid comprising a hydraulic cylinder having a piston therein, means for charging fluid under pressure into the cylinder to actuate the piston and compress the spring, and means for releasing the fluid from the cylinder whereby upon release of the fluid the spring is released and presses the lid against the base.

4. An apparatus for molding plastics comprising a die having a cavitated base and a lid separable therefrom, means for pressing the lid against the base comprising a spring, and means for lifting the lid from the base and for compressing the spring comprising a pair of tie-rods secured at one end to the lid, a hydraulic cylinder having a piston therein and a piston rod secured to the tie-rods, means for charging fluid under pressure into the cylinder to actuate the piston and to lift the tie-rods, and means for releasing the fluid from the cylinder, whereby upon the release of the fluid the compressed spring presses the lid against the base.

* * * * *